United States Patent
Candelore et al.

(10) Patent No.: US 11,503,206 B2
(45) Date of Patent: Nov. 15, 2022

(54) TECHNIQUES FOR PROVIDING PHOTOGRAPHIC CONTEXT ASSISTANCE

(71) Applicant: Sony Corporation, Tokyo (JP)

(72) Inventors: Brant Candelore, Poway, CA (US); James R. Milne, Ramona, CA (US)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 16/930,308

(22) Filed: Jul. 15, 2020

(65) Prior Publication Data
US 2022/0021805 A1    Jan. 20, 2022

(51) Int. Cl.
| | | |
|---|---|---|
| H04N 5/232 | (2006.01) | |
| G06F 16/54 | (2019.01) | |
| G06F 3/16 | (2006.01) | |
| G06N 20/00 | (2019.01) | |
| G06K 9/62 | (2022.01) | |

(52) U.S. Cl.
CPC ......... *H04N 5/23222* (2013.01); *G06F 16/54* (2019.01); *G06K 9/6256* (2013.01); *G06N 20/00* (2019.01); *H04N 5/23218* (2018.08); *H04N 5/232935* (2018.08); *H04N 5/232945* (2018.08); *G06F 3/167* (2013.01)

(58) Field of Classification Search
CPC ......... H04N 5/23222; H04N 5/232935; H04N 5/232945; H04N 5/23218; G06F 16/54; G06F 3/167; G06N 20/00; G06K 9/6256
See application file for complete search history.

(56) References Cited

U.S. PATENT DOCUMENTS

| | | | |
|---|---|---|---|
| 8,659,667 B2* | 2/2014 | Syed | H04N 5/232939 348/207.1 |
| 9,001,217 B2 | 4/2015 | Kinoshita | |
| 9,344,673 B1 | 5/2016 | Buchheit et al. | |
| 10,574,881 B2 | 2/2020 | Oleson et al. | |
| 2009/0278958 A1* | 11/2009 | Bregman-Amitai | H04N 5/23222 348/222.1 |
| 2010/0329552 A1* | 12/2010 | Yim | H04N 1/2112 382/165 |
| 2010/0332553 A1* | 12/2010 | Choi | G06T 11/60 707/802 |
| 2011/0026837 A1* | 2/2011 | Kita | H04N 5/23218 382/209 |
| 2011/0228123 A1* | 9/2011 | Matsumoto | H04N 5/23238 348/222.1 |
| 2014/0247368 A1* | 9/2014 | Chinn | H04N 5/23222 348/207.1 |
| 2014/0368698 A1* | 12/2014 | Matsutani | H04N 5/23219 348/240.2 |
| 2015/0010239 A1* | 1/2015 | He | G06K 9/6267 382/203 |
| 2015/0278606 A1* | 10/2015 | Laksono | H04N 21/8153 382/103 |

(Continued)

*Primary Examiner* — Lin Ye
*Assistant Examiner* — John H Morehead, III
(74) *Attorney, Agent, or Firm* — John L. Rogitz

(57) ABSTRACT

Photographic context assistance is provided by overlaying a composition grid selected by the user or by a machine learning algorithm onto the image of a viewfinder of a camera, and then providing audible and/or visual cues as to moving the aim point to better conform the image to the grid. Fine tuning may be effected using, for instance, stabilization hardware to gently adjust the view to better conform the image to the grid before snapping a shot.

19 Claims, 7 Drawing Sheets

(56) References Cited

U.S. PATENT DOCUMENTS

| | | | | |
|---|---|---|---|---|
| 2016/0006945 | A1* | 1/2016 | Furuhashi | H04N 5/23222 |
| | | | | 348/239 |
| 2018/0367741 | A1* | 12/2018 | Matsumura | H04N 5/23219 |
| 2019/0222772 | A1* | 7/2019 | Yang | G06T 7/73 |
| 2019/0347817 | A1* | 11/2019 | Ferrantelli | G06V 10/454 |
| 2020/0051341 | A1* | 2/2020 | Lee | G06V 10/462 |
| 2020/0387708 | A1* | 12/2020 | Candelore | G06V 40/18 |

\* cited by examiner

TECHNIQUES FOR PROVIDING PHOTOGRAPHIC CONTEXT ASSISTANCE

FIELD

The present application relates generally to techniques for providing photographic context assistance.

BACKGROUND

A problem recognized by present principles is that less-skilled photographers may experience difficulty in effectively composing a photograph. People respond favorably if unconsciously to a well-composed photo. Well-composed photos follow certain rules such Rule of Thirds, Golden Triangle, Golden Ratio, etc., and a less-skilled photographer may require assistance with this.

SUMMARY

As recognized herein, simply superimposing a composition grid on an image as an aid to photography may be less than helpful for novice photographers to understand how they are supposed to make use of the grid. As also understood herein, machine learning (or artificial intelligence (AI)) can be used to assist a photographer in improving his photos by providing recommendations for composition. The photographer can select which composition "rule" he wants to implement. A camera is programmed to recognize objects and scenes such as mountains, streams, and people. The camera can distinguish, for example, panoramic background, water and sky behind people and objects of interest (that it can also distinguish) and then determine where these are in terms of the various quadrants of the composition grids.

The camera can automatically place a composition grid or combination of grids over a live image in a viewfinder and LCD screen to help a photographer compose photos. The photographer can select which grid to use via menu select or voice command. In addition, or alternatively, the camera analyzes the image in the view and uses stabilization hardware to gently adjust the view (fine tuning) before snapping a shot according to a composition grid. In addition, or alternatively, before a photo is taken using a shutter button, the camera can provide feedback to have the photographer make some adjustments, such as to move slightly to the left or to the right. This may be thought of as coarse tuning. The feedback may be audible or as visual feedback in the LCD or viewfinder. For example, a visual cue may be a flashing arrow pointing in the direction the photographer should adjust the picture. Or, the camera can use an audible cue to aid the photographer. Both cues can be used together.

If desired, after a photo is taken the camera may analyze the image and provide feedback. It can offer to crop the image automatically.

The photographer can turn the assistance option off and on at any time.

Present principles may be implemented in a camera or in a software application such as Lightroom or Capture that may be run on a PC or a smart device.

Accordingly, in one aspect a camera includes at least one display such as a viewfinder or LCD and at least one imaging device configured to provide content to the display. The camera includes at least one processor configured with instructions executable to present an image from the imaging device on the display. The instructions further are executable to present on the image a composition arrangement, and present on the camera at least one indication of altering the image using the composition arrangement.

In example embodiments the composition arrangement includes a grid of lines perpendicular to each other and may further include at least one diagonal line oblique to the grid of line. Or, the composition arrangement can include a spiral.

In non-limiting implementations the instructions may be executable to automatically select the composition arrangement from plural composition arrangements based at least in part on image recognition executed on at least one object in the image. Alternatively, the instructions may be executable to present a human-perceptible interface to select a composition arrangement from plural composition arrangements. If desired, the instructions can be executable to automatically adjust the camera using stabilization hardware to better conform the image to the composition arrangement.

In another aspect, an imaging device includes at least one processor configured with instructions executable to provide photographic context assistance by overlaying a composition grid onto an image of a viewfinder of a camera. The instructions are executable to provide audible and/or visual cues as to moving the camera to better conform the image to the composition grid. A visual cue may include alphanumeric human language instructions regarding moving the aim point of the camera, and/or non-alpha numeric symbols, such as arrows.

If desired, the instructions may be executable to fine tune the image using stabilization hardware to gently adjust a view in a viewfinder of the device to better conform the image to the grid before snapping a shot. In some implementations the instructions are executable to present at least one user interface (UI) configured to permit selection of a first grid in a plurality of grid. Or, the instructions may be executable to automatically select the grid based at least in part on object recognition executed on the image using a machine learning engine.

In another aspect, a method is disclosed for training a machine learning (ML) engine to provide help in obtaining an image using a camera. The method includes establishing a training set of object-composition grid pairs, inputting the training set to the ML engine, and providing output of the ML engine processing the training set to an input of the ML engine to further train the ML engine. In some embodiments the pairs can include optimized placement of the respective objects relative to the respective composition grids.

The details of the present application, both as to its structure and operation, can be best understood in reference to the accompanying drawings, in which like reference numerals refer to like parts, and in which:

DETAILED DESCRIPTION

Figure 1:
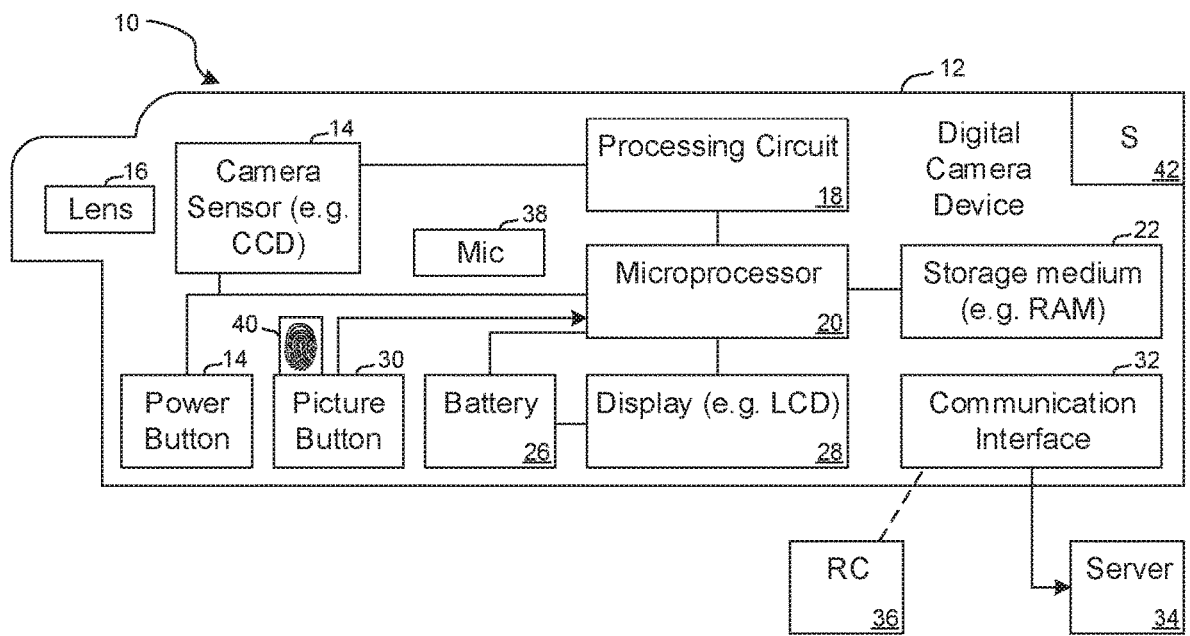
FIG. 1 is a block diagram of an example imaging device.

This disclosure relates generally to computer ecosystems including aspects of camera and other imaging ecosystems. A system herein may include server and client components, connected over a network such that data may be exchanged between the client and server components. The client components may include one or more computing devices such as portable televisions (e.g. smart TVs, Internet-enabled TVs), portable computers such as laptops and tablet computers, and other mobile devices including smart phones and additional examples discussed below. These client devices may operate with a variety of operating environments. For example, some of the client computers may employ, as examples, operating systems from Microsoft, or a Unix operating system, or operating systems produced by Apple Computer or Google. These operating environments may be used to execute one or more browsing programs, such as a browser made by Microsoft or Google or Mozilla or other browser program that can access web applications hosted by the Internet servers discussed below.

Servers may include one or more processors executing instructions that configure the servers to receive and transmit data over a network such as the Internet. Or, a client and server can be connected over a local intranet or a virtual private network.

Information may be exchanged over a network between the clients and servers. To this end and for security, servers and/or clients can include firewalls, load balancers, temporary storages, and proxies, and other network infrastructure for reliability and security. One or more servers may form an apparatus that implement methods of providing a secure community such as an online social website to network members.

As used herein, instructions refer to computer-implemented steps for processing information in the system. Instructions can be implemented in software, firmware or hardware and include any type of programmed step undertaken by components of the system.

A processor may be any conventional general-purpose single- or multi-chip processor that can execute logic by means of various lines such as address lines, data lines, and control lines and registers and shift registers. A processor may be implemented by a digital signal processor (DSP), for example.

Software modules described by way of the flow charts and photographer interfaces herein can include various subroutines, procedures, etc. Without limiting the disclosure, logic stated to be executed by a particular module can be redistributed to other software modules and/or combined together in a single module and/or made available in a shareable library.

Present principles described herein can be implemented as hardware, software, firmware, or combinations thereof; hence, illustrative components, blocks, modules, circuits, and steps are set forth in terms of their functionality.

Further to what has been alluded to above, logical blocks, modules, and circuits described below can be implemented or performed with a general-purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices.

The functions and methods described below, when implemented in software, can be written in an appropriate language such as but not limited to C# or C++, and can be stored on or transmitted through a computer-readable storage medium such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc. A connection may establish a computer-readable medium. Such connections can include, as examples, hard-wired cables including fiber optic and coaxial wires and digital subscriber line (DSL) and twisted pair wires.

Components included in one embodiment can be used in other embodiments in any appropriate combination. For example, any of the various components described herein and/or depicted in the Figures may be combined, interchanged, or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

Referring initially to FIG. 1, a digital camera 10 includes a portable lightweight hand-held housing 12 holding a camera sensor 14 such as but not limited to a charge-coupled device (CCD). The sensor 14 produces images sensed through a lens 16, and in the example non-limiting embodiment shown the images are sent to a processing circuit.

In turn, processing circuitry 18, which may include image stabilization hardware, may communicate with a camera processor 20 in the housing 12, which can access and store data on a computer-readable medium 22. The medium 22 may be, without limitation, disk-based storage, and/or solid-state storage and in one implementation is implemented by random access memory (RAM). To activate the camera 10, a power button 24 may be provided on the housing 12. A photographer can manipulate the power button 24 to cause one or more camera batteries 26 to energize the components of the camera 10, including the processor 20 and a visual display 28 such as but not limited to a liquid crystal display (LCD) and/or viewfinder. Also, a picture key 30 typically is provided on the housing 12 that can be manipulated by a photographer to signal the photographer's desire to capture a frame (or, in the case of a video camera, multiple frames) as a picture, it being understood that the term "picture key" refers to any hard or soft photographer-manipulable element that causes the camera to capture an image or images.

Also, one or more wireless network communications interfaces 32 such as but not limited to a Wi-Fi interface or a Bluetooth or other interface may be provided to enable the camera processor 20 to communicate with one or more servers 34 and/or one or more remote control (RC) devices 36 described below over the Internet or other network or direct point to point. In other embodiments, a wired communication interface may be used. In any case, it is to be understood that the camera 10 may be implemented as an electronic device with an imaging sensor and storage such as digital cameras per se, camera-equipped mobile phones, personal digital assistants (PDAs), and notebook computers with built in cameras. It is to be understood that the RC 36 includes processing circuitry, wireless transceiver circuitry, control keys, etc. to permit the RC 36 to control the camera 10. One or more sound-to-electrical transducers 38 such as microphones may be provided on the camera for purposes to be shortly disclosed. If desired, a fingerprint reader 40 may be provided on, e.g., the picture key 30 as shown. One or more speakers 42 may be provided for providing audible assistance.

Prior to disclosing logic below it is to be understood that the logic herein may be executed by the camera processor 20, the processor of the remote-control device 36 when provided and in communication with the camera, or a combination thereof.

Figure 2:
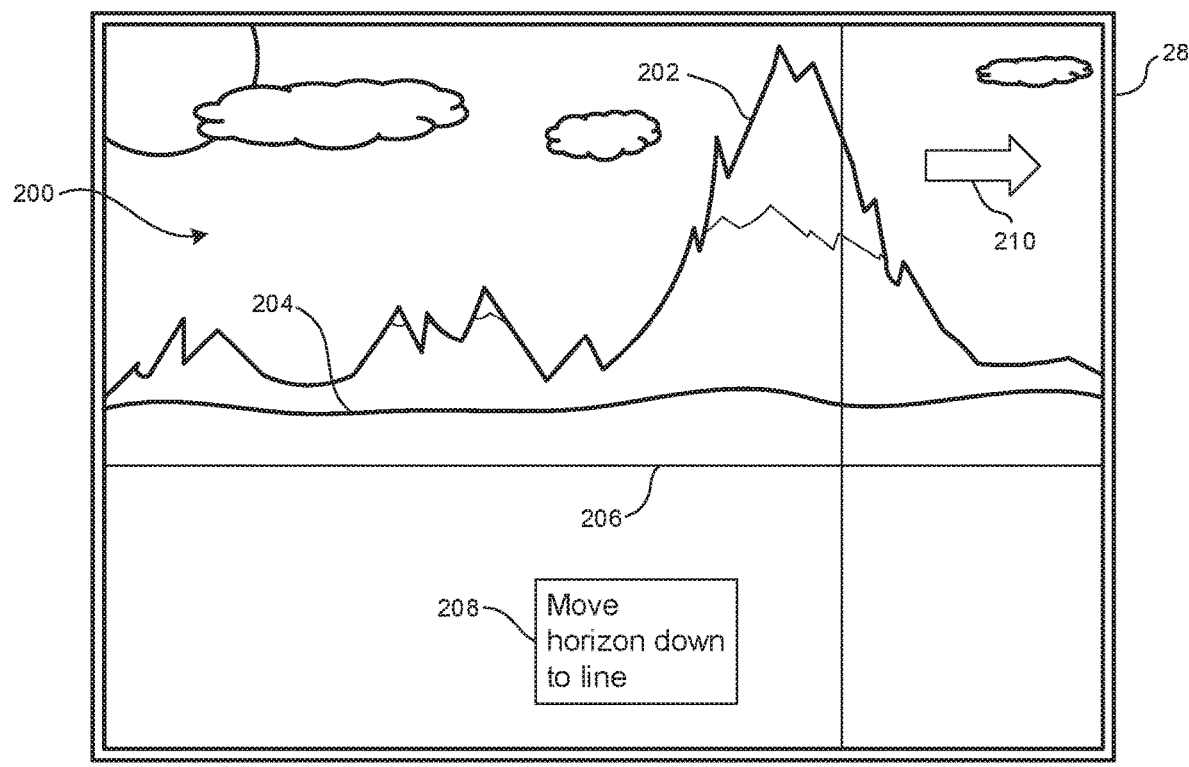
FIG. 2 is a screen shot illustrating a composition grid overlaid on an image in, e.g., a viewfinder of the camera of FIG. 1 along with assist indicia.

Now referring to FIG. 2, an image 200 being generated by the sensor 14 in FIG. 1 may be presented on the display 28 such as the camera viewfinder or liquid crystal display (LCD). In the example shown, the image 200 include a mountain 202 rising above a horizon 204.

FIG. 2 illustrates that a composition arrangement 206 such as a simplified grid with perpendicular lines is also presented on the image 200. In addition to the composition arrangement and image, as illustrated in FIG. 2 at least one visual and/or audible indication is presented of altering the image using the composition arrangement. More particularly, in the example shown a visual cue 208 may be presented that includes alpha-numeric instructions for moving the camera to better conform the image 200 to the composition arrangement 206, in the example shown, by moving the camera so that the horizon 204 is moved onto the horizontal line of the composition arrangement 206. The same cue may be presented audibly on the speaker 42 shown in FIG. 1. In addition or alternatively, a visual cue 210 may be presented that includes a non-alpha-numeric symbol, in the example shown, an arrow pointing to the right, indicating that the camera should be moved right which would place the image of the mountain 202 within the upper left quadrant of the example composition arrangement 206.

Figure 3:
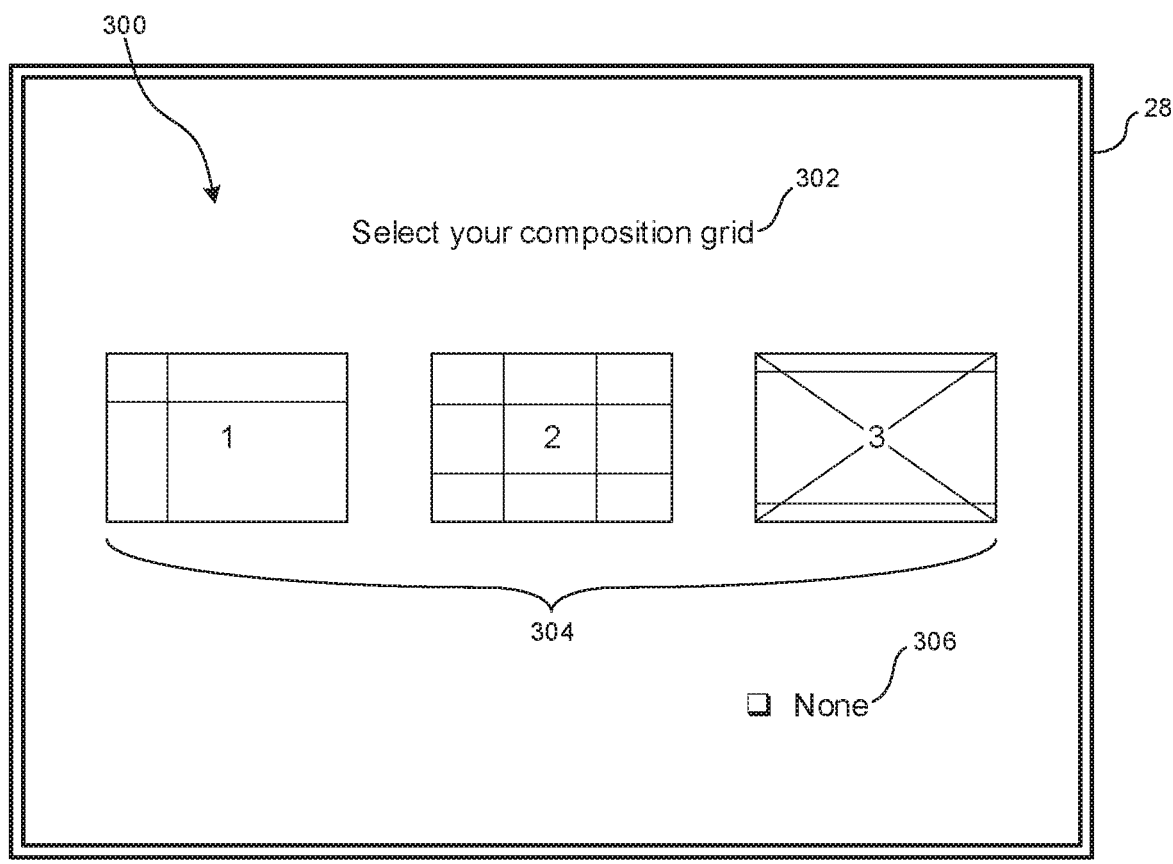
FIG. 3 is a screen shot of a user interface (UI) that may be presented to permit a user to select a composition grid.

FIG. 3 illustrates a UI 300 that may be presented on the display 28 that can include a prompt 302 for the user to select a composition arrangement to be used from plural arrangements 304. Selection may be made by speaking the identification of the desired arrangement or by touching the arrangement on a touch-sensitive display 28. The user can select to turn off the help feature by selecting "none" 306.

Figure 4:
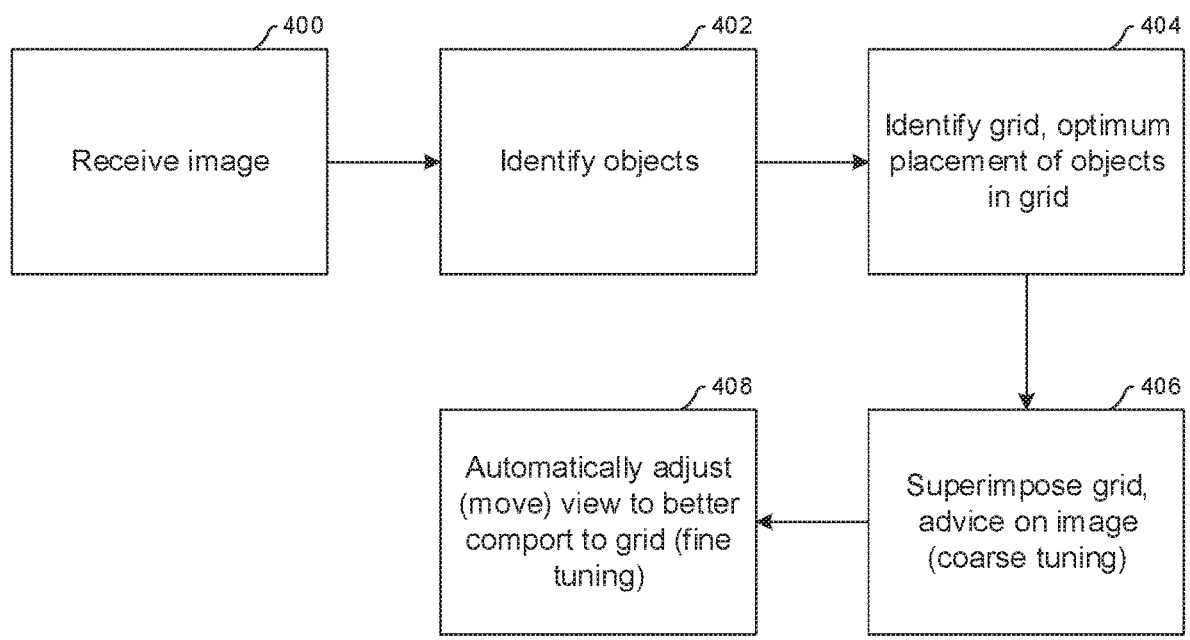
FIG. 4 illustrates example logic in example flow chart format for providing automatic grid selection and assistance advice.

Now referring to FIG. 4, commencing at block 400 an image from the sensor 14 is received and presented in, e.g., the viewfinder of the camera. Moving to block 402, a composition arrangement may be automatically selected based on the object recognition and an optimum placement of objects in the image with respect to the composition arrangement may be determined using machine learning principles the training of which is described further herein.

Note that in embodiments in which the user manually selects a composition arrangement, at block 404 no new composition arrangement need be identified.

Proceeding to block 406, the composition arrangement is superimposed onto the image in the viewfinder (and/or LCD) and at least one visual and/or audible indication is presented of altering the image using the composition arrangement as described above in reference to FIG. 2. This may be thought of as a coarse tuning step.

Block 408 of FIG. 4 represents what might be thought of as a fine-tuning step, in which the camera is automatically adjusted without user intervention using, for instance, stabilization hardware to better conform the image to the composition arrangement. Essentially, block 408 incrementally moves the image as it would for stabilization to bring the image more closely in conformance to the composition arrangement as determined by the ML engine.

FIGS. 5-12 illustrate example composition arrangements, many of which use the Golden Ratio or Golden Mean. The Golden Ratio is a design principle based on the ratio of 1 to 1.618. Two examples of the Golden Ratio are the Phi Grid and the Fibonacci Spiral.

Figure 5:
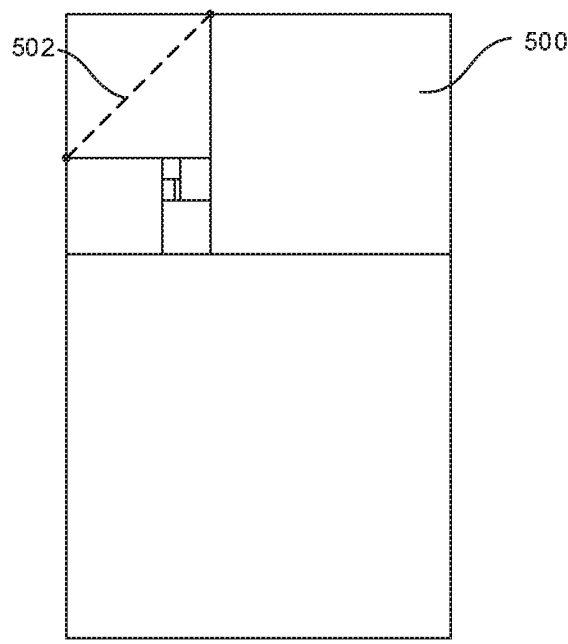
FIGS. 5-12 illustrate example composition grids that may be used.
Figure 6:
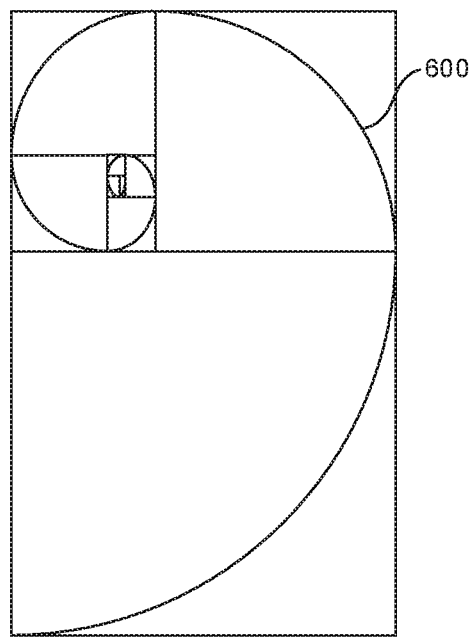

In FIG. 5, a series of squares 500 is shown that are created using Fibonacci's numbers, with the length of each square being a Fibonacci number. Each square 500 includes a diagonal 502 from one corner to the opposite corner. FIG. 6 illustrates that a spiral 600 can be formed through the end points of the diagonals 502 of the squares 500 starting from the smallest square and ending at the largest. The spiral 600 can be used to compose a photograph will allow the viewer to be led around the image in a natural flow. The composition arrangements in FIGS. 5 and 6 may be most suitable to human faces, i.e., portraits.

Figure 7:
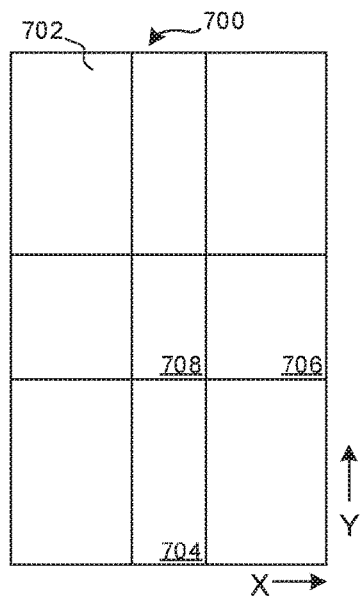

FIG. 7 illustrates an example of a Phi Grid 700 that may be used for landscapes. In a Phi Grid, the Golden Ratio is applied to divide the frame into sections resulting in a grid that is 1:0.618:1. Accordingly, four corner rectangles 702 are horizontally separated by an intervening top or bottom rectangle 704 of the same y-dimension magnitude as the corner rectangles 702 but with a narrower x-dimension magnitude. The four corner rectangles 702 are vertically separated by an intervening left or right rectangle 706 of the same x-dimension magnitude as the corner rectangles 702 but with a narrower y-dimension magnitude. A central rectangle 708 has the same x-dimension magnitude as an intervening top or bottom rectangle 704 and the same y-dimension magnitude as an intervening left or right rectangle 706.

Figure 8:
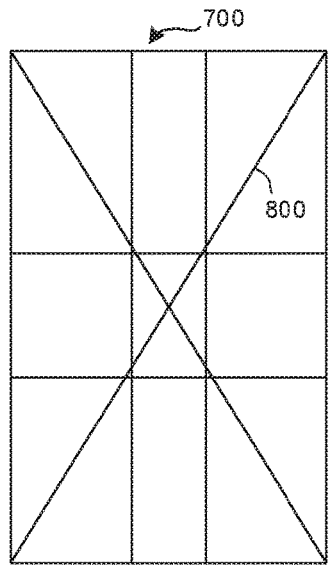
Figure 10:
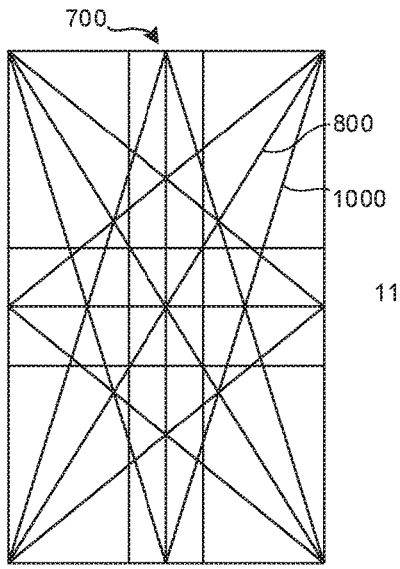
Figure 9:
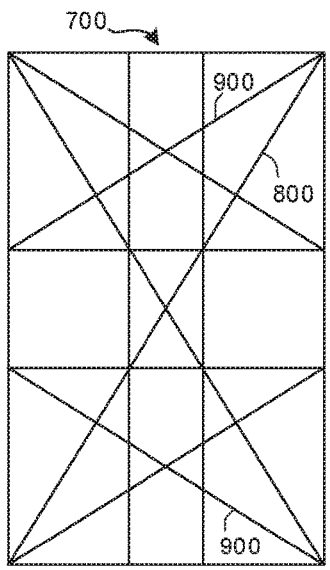

FIGS. 8-10 illustrate variations of FIG. 7. In FIG. 8 two diagonals 800 extend from the respective corners of the Phi Grid 700. FIG. 9 adds to FIG. 8 by implementing top and bottom diagonals 900 extending from opposite corners of the top and bottom, respectively, corner rectangles 702. FIG. 10 adds to FIG. 8 by implementing, on either side of each diagonal 800, two diagonals 1000 extending from the respective corners of the Phi Grid 700, one to the center point of the outer edge of the opposite intervening left or right rectangle 706 and one to the center point of the outer edge of the opposite intervening top or bottom rectangle 704.

Figure 11:
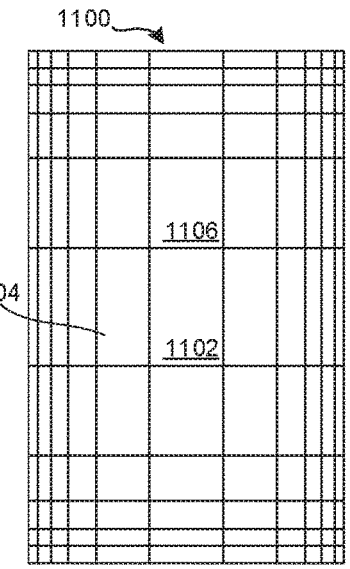

FIG. 11 illustrates a composition arrangement 1100 that is essentially opposite to that of FIG. 7, in which a central rectangle 1102 is larger and surrounded by progressively narrower (in the x-dimension) rectangles 1104 in the x-dimension and progressively shorter (in the y-dimension) rectangles 1106 in the y-dimension, which each rectangle in a row of rectangles having the same height and each rectangle in a column of rectangles having the same width.

Figure 12:
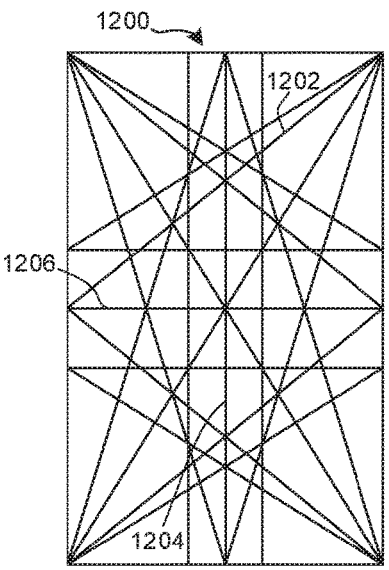

FIG. 12 depicts a composition arrangement 1200 similar to that of FIG. 10 except in FIG. 12 a respective diagonal 1202 is added from each corner to the corner of the opposite intervening rectangle's midpoint, with bisectors 1204, 1206 extending vertically and horizontally, respectively, through the midpoint of the arrangement.

Figure 13:
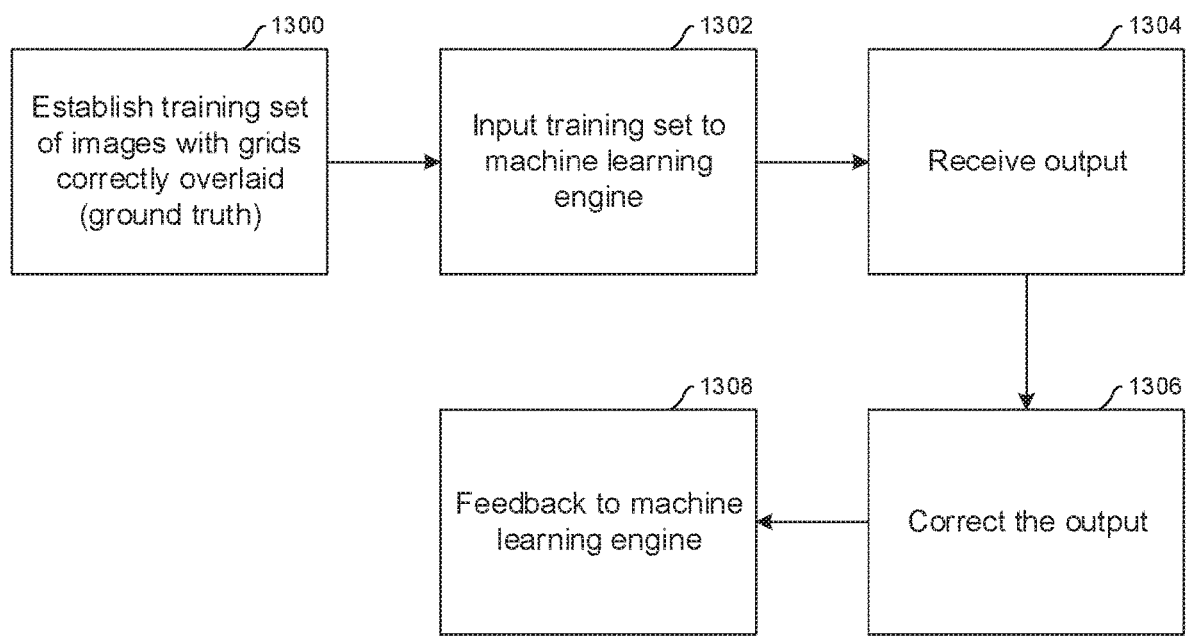
FIG. 13 illustrates example logic in example flow chart format for training a machine learning engine to execute the logic of FIG. 4.

Now referring to FIG. 13, a machine learning engine that may include one or more neural networks can be trained by establishing a ground truth training set at block 1300. The training set may include pairs of objects that may appear in images along with one or more composition arrangements for each object that may be used when the object is recognized in an image. When an object is associated with multiple composition arrangements the composition arrangements for that object may be ranked from most preferred to least preferred, and then later when multiple objects are recognized in an image, the composition arrangement that best fits the most objects is selected.

For each composition arrangement that an object may be associated with, its optimum placement is defined within the composition arrangement by, e.g., an expert. Coarse and fine tuning at blocks 406 and 408, respectively, of FIG. 4 use the optimum placement of a recognized object within a composition arrangement to identify the actual placement of the object relative to the optimum placement and use the difference to implement the tuning to reduce the difference as much as possible.

The training set is input to the ML engine at block 1302, which generates output that is received at block 1304 and corrected by, e.g., an expert at block 1306. The corrected output is fed back to the ML engine at block 1308.

In some example embodiments, composition may be optimized for a particular object recognized by the ML engine as being of interest or selected by the user. The ML engine may process an image to differentiate between background and people, pets, and objects that are in the foreground by being recognized as being in the center of the image. Camera focus may be set to infinity. The processor executing an algorithm may assume that an object in focus is of more interest or importance than objects in the background that are out-of-focus. Alternatively, the user may designate objects of interest to the processor by, e.g., pointing in a touch-screen display, which can cause the processor to outline the pointed-to object on the camera display and if desired shade the object to show it as being selected. The user can re-touch the image to de-select the object in the image. In either case, whether user-designated or whether recognized by the ML engine automatically as being of interest, the ML engine can optimize the composition of the image based on optimizing the composition of that object.

Note that as mentioned above, composition grids can be turned ON/OFF, for example, via menu control, button, or voice command. New grids can be downloaded from the cloud (free or for purchase). The download could be done by the camera or by a smart device and transferred to camera. If desired, provision can be made in the form of, e.g., UIs for users to create their own grids and load to the camera via the SD card, USB port, BT, Wi-Fi, NFC, LAN port, etc.

While the particular embodiments are herein shown and described in detail, it is to be understood that the subject matter which is encompassed by the present invention is limited only by the claims.

What is claimed is:

1. A camera comprising:
at least one display;
at least one imaging device configured to provide content to the display; and
at least one processor configured with instructions executable to:
present an image from the imaging device on the display;
present on the image a composition arrangement; and
present on the camera at least one indication of altering the image using the composition arrangement, wherein the image comprises at least a first object associated with multiple composition arrangements and the composition arrangements for the first object are ranked such that when subsequent objects are recognized in an image, a composition arrangement is selected based at least in part on the subsequent objects.

2. The camera of claim 1, wherein the display comprises a view finder.

3. The camera of claim 1, wherein the display comprises an LCD.

4. The camera of claim 1, wherein the composition arrangement comprises a grid of lines perpendicular to each other.

5. The camera of claim 4, wherein the composition arrangement comprises at least one diagonal line oblique to the grid of line.

6. The camera of claim 1, wherein the composition arrangement comprises a spiral.

7. The camera of claim 1, wherein the instructions are executable to:
automatically select the composition arrangement from plural composition arrangements based at least in part on image recognition executed on at least one object in the image.

8. The camera of claim 1, wherein the instructions are executable to:
present a human-perceptible interface to select a composition arrangement from plural composition arrangements.

9. The camera of claim 1, wherein the instructions are executable to:
automatically adjust the camera using stabilization hardware to better conform the image to the composition arrangement.

10. An imaging device comprising:
at least one processor configured with instructions executable to:
provide photographic context assistance at least in part by:
present, for a camera generating an image, at least one indication of altering the image using a composition, wherein the image comprises at least a first object associated with plural compositions and the compositions for the first object are ranked such that when subsequent objects are recognized in an image, a composition from the plural compositions is selectable based at least in part on the subsequent objects.

11. The imaging device of claim 10, wherein the instructions are executable to:
fine tune the image using stabilization hardware to adjust a view in a viewfinder of the device to better conform the image to the composition before snapping a shot.

12. The imaging device of claim 10, wherein the instructions are executable to:
present at least one user interface (UI) configured to permit selection of a first composition in a plurality of compositions.

13. The imaging device of claim 10, wherein the instructions are executable to:
automatically select the composition based at least in part on object recognition executed on the image using a machine learning engine.

14. The imaging device of claim 10, wherein the instructions are executable to:
provide at least one audible cue as to moving the camera to better conform the image to the composition.

15. The imaging device of claim 10, wherein the instructions are executable to:
provide at least one visual cue as to moving the camera to better conform the image to the composition.

16. The imaging device of claim 15, wherein the visual cue comprises alpha-numeric instructions.

17. The imaging device of claim 15, wherein the visual cue comprises at least one non-alpha-numeric symbol.

18. A method for training a machine learning (ML) engine to provide help in obtaining an image using a camera, comprising:
- establishing a training set of object-composition grid pairs;
- inputting the training set to the ML engine; and
- providing output of the ML engine processing the training set to an input of the ML engine to further train the ML engine.

19. The method of claim 18, wherein the pairs comprise optimized placement of the respective objects relative to the respective composition grids.

* * * * *